United States Patent [19]

Towns

[11] Patent Number: 5,035,084
[45] Date of Patent: Jul. 30, 1991

[54] GATE FITTINGS

[75] Inventor: Robert C. Towns, Dumbalk, Australia

[73] Assignee: Keswick Lake Pty. Ltd., Victoria, Australia

[21] Appl. No.: 524,234

[22] Filed: May 16, 1990

[30] Foreign Application Priority Data

May 17, 1989 [AU] Australia ............... PJ4221

[51] Int. Cl.⁵ ........................................... E06B 11/00
[52] U.S. Cl. ...................................... 49/381; 16/253; 474/114
[58] Field of Search ................... 49/381, 394; 16/252, 16/253; 160/328, 329; 292/247; 474/113-115, 136

[56] References Cited

U.S. PATENT DOCUMENTS

| 1,143,583 | 6/1915 | Hotchkiss | 474/114 X |
| 1,261,365 | 4/1918 | Cummmings | 292/247 |
| 1,313,411 | 8/1919 | Myers | 16/253 |
| 1,413,028 | 4/1922 | Ireland | 474/114 |
| 1,467,029 | 9/1923 | Durham | 16/253 |
| 1,469,425 | 10/1923 | Mehanna | 16/252 |
| 2,062,128 | 11/1936 | Hamerstadt | 474/114 X |
| 2,592,722 | 4/1952 | Noll | 160/328 |
| 2,803,899 | 8/1957 | Denovan | 160/328 |
| 3,811,149 | 5/1974 | Griffin | 16/253 |
| 3,893,724 | 7/1975 | Reinfeld | 292/247 |
| 4,127,292 | 11/1978 | Mader | 160/328 X |

FOREIGN PATENT DOCUMENTS

| 141069 | 9/1949 | Australia | 16/253 |
| 506787 | 11/1979 | Australia | |
| 585997 | 1/1987 | Australia | |
| 548221 | 11/1957 | Canada | 160/328 |
| 651686 | 4/1951 | United Kingdom | 16/253 |
| 897887 | 5/1962 | United Kingdom | 16/253 |

Primary Examiner—Rodney M. Lindsey
Assistant Examiner—Jerry Redman
Attorney, Agent, or Firm—Birch, Stewart, Kolasch & Birch

[57] ABSTRACT

A gate fitting for securing a gate to a gateway post. The fitting has support means for connecting to a gate frame member. The support means includes a gate hinge member for hinged mounting of the frame member, or a gate closure member for connecting to the frame member to securely retain the gate in a closed position in a gateway. Mounting means is provided for mounting the support means on a gateway post. The mounting means includes at least one elongate binding member for extending from the support means and about gateway post. A tensioning unit acts between the binding member and the gateway post in order to tension the binding member about the post and so secure the support means in position on the gateway post.

8 Claims, 2 Drawing Sheets

GATE FITTINGS

BACKGROUND OF THE INVENTION

1. Field of the Invention

This invention relates generally to gate fittings, and in particular to such fittings for hanging a gate and retaining that gate in a closed position across a gateway. The invention is applicable to gates installed in post and wire farm fences, and it will be convenient to hereinafter describe the invention in relation to that exemplary application. However, it is to be appreciated that the invention is not limited to that application.

2. Description of the Related Art

Post and wire farm fences are generally of a sturdy and strong construction, particularly where they are required to retain or control animal stock. For example, in post and wire fences, timber fence posts having a diameter of at least 125 mm are commonly used. Gates installed in such fences are generally hung between adjacent fence posts. The gates may be constructed from timber or metal material.

The work involved in hanging a gate is labour-intensive and time consuming. One reason is that fittings for hanging and retaining the gates must be mounted on the fence posts as well as on the gate itself. Conventional fittings typically involve boring through the fence and gate posts for fixing of bolts, pins and the like. Because of the thickness of the posts it may take significant time and effort to bore those holes.

Furthermore, once these fittings have been installed, it is often difficult to make any adjustments to the gate. Thus, it is generally necessary to remove the bolts or pins and replace them if the gate does not hang properly within the gateway.

In an effort to overcome these disadvantages a number of fittings have been developed that require no more than a minimum of work on the posts and can be readily adjusted or re-fitted.

One such gate fitting is disclosed in Australian patent 585997 (59259/86). The fitting of that patent has a mounting bracket or pin for engaging a gate, and a pair of securing chains which extend from opposite sides of the bracket or pin, and pass partially about a gate post. Fastening pins are provided for driving through links in the chains into opposite sides of the post, to retain the chains taut about the post and so mount the fitting.

A disadvantage with this fitting is the necessity to drive the fastening pins into the gate post. The hard, dry material typically used for the posts can particularly make accurate positioning of the pins difficult to achieve. As a result, it can be difficult to install the fitting with sufficient tension on the chains to securely hold the fitting in position. The pins can also tend to work loose during gate use so that the gate may soon drop from a correct hanging position. In addition, adjustment of the fitting can require re-positioning of at least one pin which, again, may not be easy or quick to achieve.

A further gate fitting is disclosed in Australian patent 506787 (29999/77). That fitting has a gate hinge bracket bolted to a flexible band which encircles a gate post. A pair of angle brackets are removably secured to the band, and a tightening nut and bolt extend between the angle brackets to draw them together and so pull the band tight around the post.

This fitting overcomes the disadvantages caused by the fastening pins of the previous fitting. However, the various separate parts of this fitting are prone to working loose so that the band becomes slack and the gate drops or shifts. In addition, the angle brackets tend to bend under tension applied by the taut band, again causing the band to slacken. It can also be difficult to pull the band sufficiently tight around the post with the angle brackets without stripping the thread on the tightening bolt.

SUMMARY OF THE INVENTION

It is an object of the present invention to provide gate fittings which can be more quickly and accurately secured to the fence and gate, and which are firmly retained on a gate post yet permit ready adjustment of the gate relative to the gateway in order to optimise gate hanging.

With this in mind, the present invention provides a gate fitting for securing a gate to a gateway post, including: support means for connecting to a gate frame member; and, mounting means for mounting the support means on a gateway post, the mounting means including at least one elongate binding member for extending from the support means and about the gateway post, and a tensioning unit for acting between the binding member and the gateway post in order to tension the binding member about the post and thereby secure the support means in position on the gateway post.

The present invention also provides a set of the above gate fittings for hanging a gate between a pair of gateway posts and releasably retaining the gate in a closed position across the gateway.

The gate fitting has various constructions depending on its intended function. In that regard, in one preferred embodiment, the fitting performs as a gate hinge fitting for hinged hanging of the gate to the gateway post. Two or more such fittings may be required for proper hanging of the gate. In an alternative preferred embodiment, the fitting is a gate closure fitting which acts to releasably retain the gate in a closed position across the gateway. Only one such fitting may be required for secure closure of the gate. The set of gate fittings provides the necessary variety of fitting constructions to enable both hinged hanging and retained closure of the gate, and the number of fittings may vary according to the type of gate and fence, as will be well appreciated by those skilled in the relevant art.

Preferably, a pair of binding members are provided. Those binding members are connected to respective opposite sides of the support means, and, in use of the fitting, extend in opposite directions about the gateway post to the tensioning unit. The binding members are binding chains in one preferred embodiment.

Preferably, the binding member has a plurality of connecting holes. The tensioning unit preferably has connecting hooks for loosely engaging through selected holes for connection of the binding member.

Preferably, the tensioning unit includes a tensioning body to which the binding member is connected. In addition, preferably adjustment means are carried by the tensioning body and movable relative thereto. The adjustment means is engageable with the gateway post and movable relative to the tensioning body in order to move the tensioning body radially away from the gateway post and so tension the binding member about the gateway post. In one preferred embodiment, the adjustment means includes an elongate adjustment bolt screw threaded into the tensioning body. A leading end of the screw engages the gateway post. The adjustment bolt is rotatable to linearly move the tensioning body away from the gateway post to tension the binding member.

Preferably, the adjustment means also includes a pressure plate adjacent the leading end for abutting against the gateway post.

Preferably, the leading end of the adjustment bolt is tapered to a point for penetrating into the gateway post.

BRIEF DESCRIPTION OF THE DRAWINGS

The following description refers to preferred embodiments of the gate fitting of the present invention. To facilitate an understanding of the invention, reference is made in the description to the accompanying drawings where the gate fitting is illustrated in those preferred embodiments. It is to be understood that the gate fitting is not limited to the preferred embodiments as hereinafter described and as illustrated in the drawings.

In the drawings.

DESCRIPTION OF THE PREFERRED EMBODIMENTS

Figure 1:
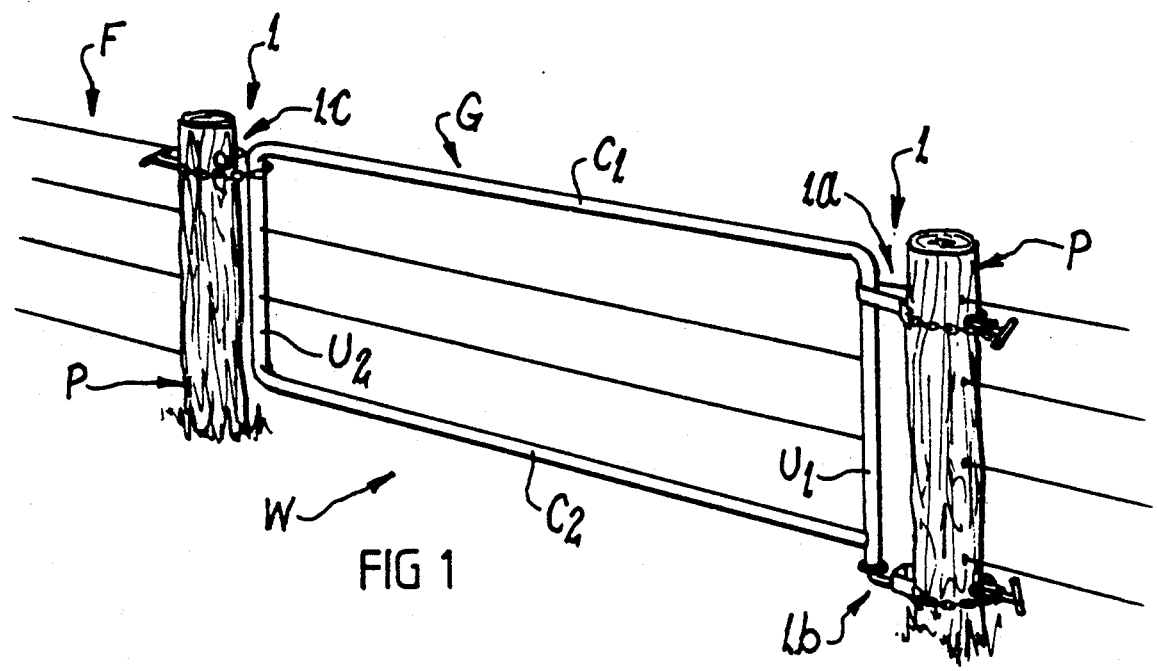
FIG. 1 is a perspective view of a gate hung within a gateway in a fence with gate fittings according to preferred embodiments of the present invention.
Figure 5:
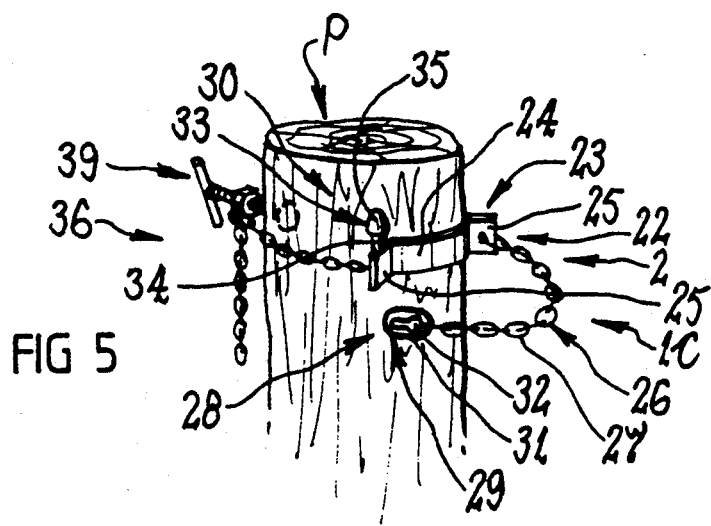
FIG. 5 is a detailed perspective view of one gateway post and associated gate fitting of FIG. 2, with the gate released from the fitting.
Figure 6:
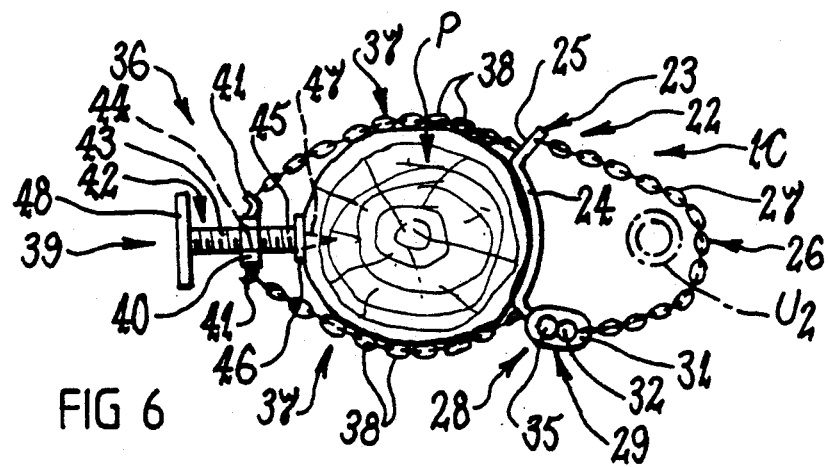
FIG. 6 is a top sectional view through section VI—VI of the gateway post and gate of FIG. 2.
Figure 2:
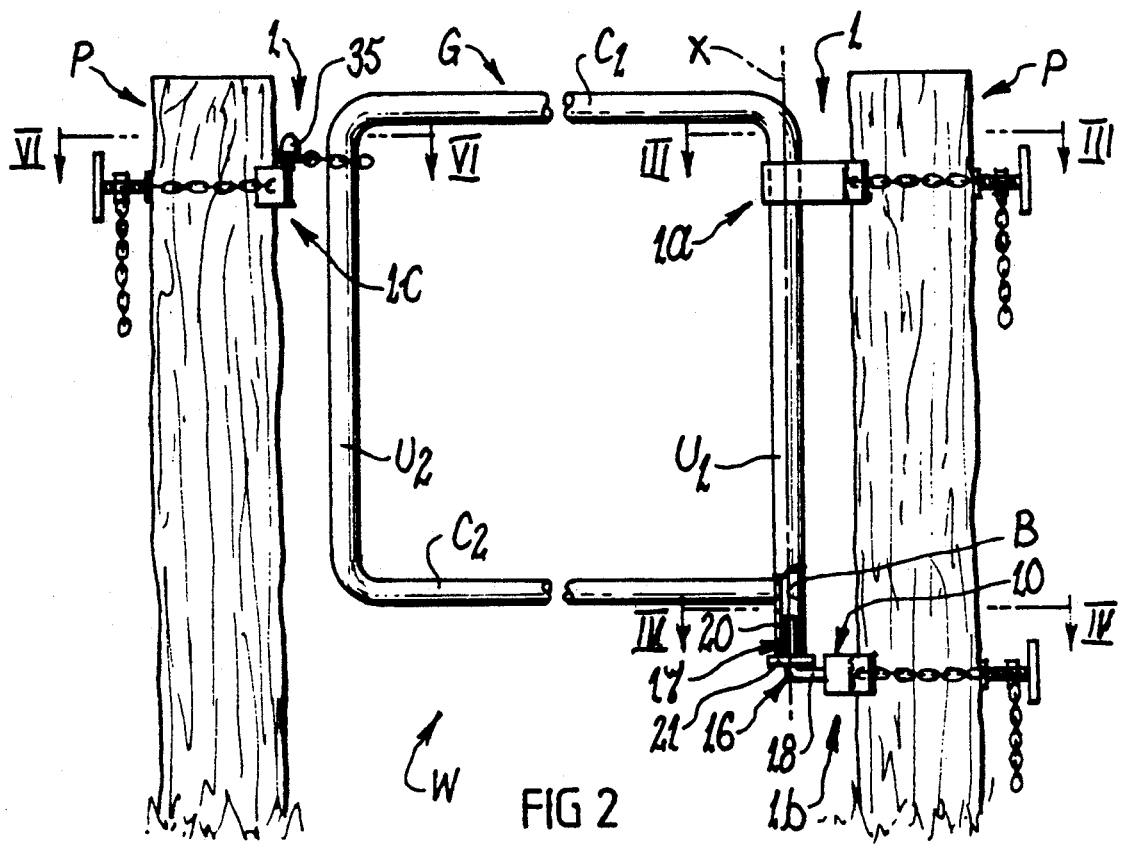
FIG. 2 is a front view of the gate and gateway with the gate fittings of FIG. 1.
Figure 3:
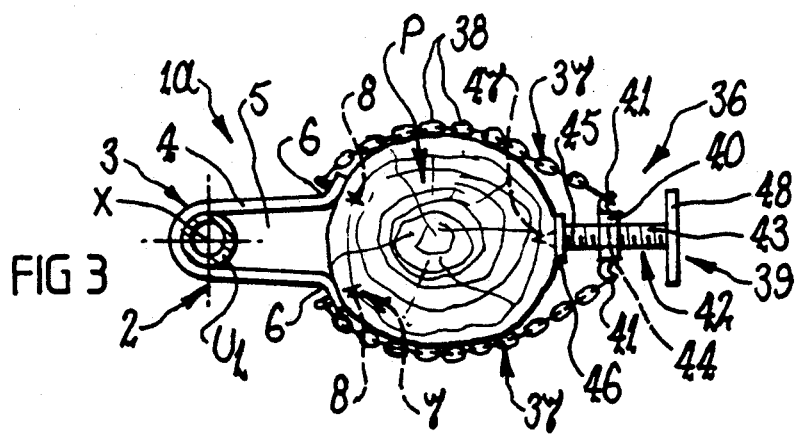
FIG. 3 is a top sectional view through section III—III of the gateway post and gate of FIG. 2.
Figure 4:
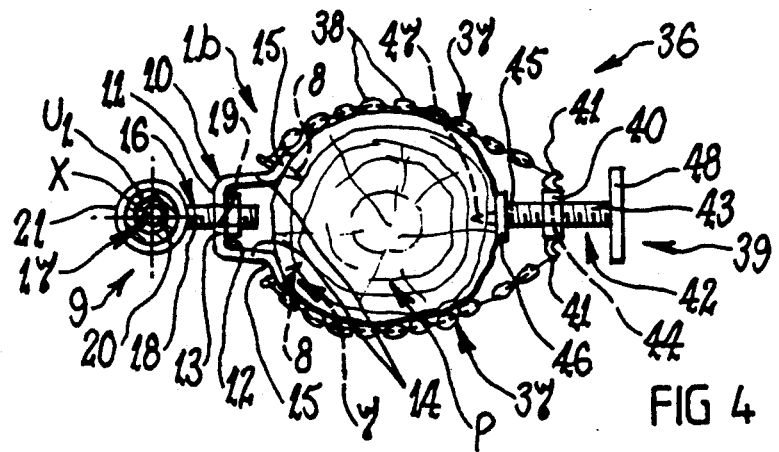
FIG. 4 is a top sectional view through section IV—IV of the gateway post, and gate of FIG. 2.

Referring initially to FIGS. 1 and 2 there is generally shown a post and wire fence F having a pair of spaced apart posts P defining gateway W. Fitted in the gateway W is a gate G. The gate G has a pair of upright member $U_1$, $U_2$, connected by a pair of cross members $C_1$, $C_2$. The upright members $U_1$, $U_2$ and cross members $C_1$, $C_2$ are composed of tubular steel, with the upright member $U_1$ providing an open ended bore B at a lower end thereof.

The gate G is hung within the gateway W by means of a set of gate fittings 1. These gate fittings 1 comprise a pair of gate hinge fittings 1a, 1b for hinged hanging of the gate G to one of the gateway posts P. Three or more such hinge fittings may be provided, if required to support the gate. The gate fittings 1 also comprises a gate closure fitting 1c which functions to releasably retain the gate G in a closed position across the gateway W as shown in FIGS. 1 and 2. Only one such fitting 1c need be required to secure the gate G. The various gate fittings 1 are shown in more detail in FIGS. 3 to 6.

Each gate fitting 1 includes a support means 2 for connection to one of the upright members $U_1$, $U_2$, the nature of the support means 2 varying between the gate fittings 1a, 1b, 1c having regard to the particular purpose of that support means 2.

In the gate hinge fitting 1a (FIG. 3), the support means 2 is in the form of a female pivot support 3 including a support body 4 having a pivot recess 5 defining in part a pivot axis X of the gate G. The upright member $U_1$ is pivotably received in the pivot recess 5 for hinged connection to the gate fitting 1a. The support body 4 is provided by a strip of metal or other suitable material which has been bent or otherwise formed into a generally U-shaped section, the interior of that section providing a through channel which forms the pivot recess 5. Terminal end edge portions 6 of the support body 4 extend in opposing outward directions and are arranged to abut the gateway post P so as to positively locate the pivot support 3.

To more positively locate the pivot support 3 on the gateway post P, penetration means 7 may be provided on the support body 4 to penetrate the gateway post P when mounted thereon. This may be achieved by zones of the end edge portions 6 being bent or punched out to provide penetration spikes 8 which bite into the gateway post P upon location of the support body 4 against the gateway post P.

In the gate hinge fitting 1b (FIG. 4), the support means 2 is in the form of a male pivot support 9 including a support body 10 having a front face 11 and an opposing rear face 12. The support body 10 is formed from a length of metal channel section, the cross section of which is typically defined by a central wall 13 and a pair of parallel, adjacent side walls 14 extending laterally from the opposite edge regions of the central wall 13. Each side wall has a terminal end edge portion 15 extending generally laterally from the remainder of the side wall 14. Those peripheral edge portions 15 extend in opposing, outward directions and are arranged to abut the gateway post P so as to positively locate the pivot support 9 on the gateway post P. The front and rear faces 11, 12 are thereby provided by the outer and inner surfaces, respectively, of the central wall 13.

Again, to more positively locate the male pivot support 9 against the gateway post P, penetration means 7 may be provided as with the female pivot support 3 previously described.

The male pivot support 9 also includes a support arm 16 extending outwardly from the front face 11 of the support body 10. That support arm 16 extends perpendicularly from the front face 11, and a support shaft 17 is provided on the arm 16 and defines in conjunction with the pivot recess 5 the pivot axis X about which the gate G hinges.

The support arm 16 includes a screwbolt 18 supported in a threaded bore 19 in the support body 10, whilst the support shaft 17 extends from an end thereof remote from the support body 10. This arrangement allows the position of the pivot axis X relative to the support body 10, and thus the gateway post P, to be adjusted. The threaded bore 19 may be provided by a screw nut secured to the central wall 13 of the support body 10.

The support shaft 17 has a tapered stub section 20 and an annular bearing flange 21 located at one end thereof toward the support arm 16. The stub section 20 tapers away from the bearing flange 21 toward a terminal other end.

This male pivot support 9 is particularly suitable for use with metal gates (as shown), although it may be equally suitable, perhaps with some modifications, to other material gates. In this arrangement, the support shaft 17 is received in the bore B in the gate upright member $U_1$ so that the gate G pivots or hinges on the stub section 20 about the pivot axis X.

In another arrangement (not shown) the gate upright member $U_1$ may have a sleeve rigidly attached thereto and provide an axial bore for receiving the support shaft 17. Again, one end face of that sleeve may bear against the bearing flange 21 for support of the gate G.

In the gate closure fitting 1c (FIGS. 5,6), the support means 2 is in the form of a closure support 22 having a main body 23 with a middle saddle portion 24 for abutting the gateway post P, and end portions 25 extending away from the saddle portion 24 and so away from the gateway post P. The main body 23 is formed from a strip of metal or other suitable material.

The closure support 22 also includes a gate restraining means 26 carried by the main body 23 and releasably engageable with the gate upright member $U_2$ to secure the gate G in a closed position. In this embodiment, the restraining means 26 acts to tie the gate G in the closed position.

The gate restraining means 26 includes an elongate restraining member 27 extending from the main body 23 and about the upright member $U_2$. One end of the restraining member 27 is permanently attached to the main body 23, whilst the other end is releasably attached thereto as that the restraining member 27 can be looped about the upright member $U_2$ for securing the gate G and unlooped for gate release. The restraining member 27 includes a restraining chain (as shown) or wire (not shown).

The restraining means 26 is provided with a restraining catch 28 for releasable attachment of the restraining member 27 to the main body 23. That catch 28 includes cooperative catch members 29, 30 on the restraining member 27 and main body 23. The catch member 29 includes a catch plate 31 with a keyhole shaped aperture 32 therein, whilst the catch member 30 of the main body 23 includes a catch bolt 33 attached to and extending generally upwardly from the main body 23. The catch bolt 33 may have a stem portion 34 with an enlarged head portion 35 over which the wider portion of the keyhole aperture 32 can pass. The narrower portion of that keyhole aperture 32 then engages about the stem portion 34 so as to prevent unintentional release of the catch plate 31 therefrom.

In an alternative embodiment (not shown), the gate restraining means 26 may include a pad-bolt slidably mounted on the main body 23, that bolt being arranged to engage a bore in the upright member $U_2$ when the gate G is in the closed position.

Each gate fitting 1a, 1b, 1c also includes a mounting means 36 for mounting the support means 2 on the gate posts P.

The mounting means 36 includes a pair of binding members 37 each connected to the respective support 3, 9, 22 and extending therefrom oppositely about the gateway post P. In this embodiment, the binding members 37 are chains, although it is envisaged that in other embodiments the binding members 37 are binding straps, bands or belts of apertures 38 therealong which, when the binding members 37 are chains, are provided by individual links.

The mounting means 36 also includes a tensioning unit 39 to which the binding members 37 are connected for tensioning about the post P. As shown, the tensioning unit 39 will generally be located diametrically opposite the support means 2.

The tensioning unit 39 includes a tensioning body 40 having a pair of connecting hooks 41 extending therefrom for engaging in the respective apertures 38 of the binding members 37. As the apertures 38 are spaced along the binding members 37, this allows the length of the binding members 37 from the respective support 3, 9, 22 to the apertures 38 engaged by the hooks 41 to be varied depending on the diameter of the gateway post P to which the gate fitting 1 is mounted.

Although the above arrangement is a convenient arrangement for achieving interengagement between the binding members 37 and the tensioning unit 39, it is to be appreciated that other arrangements are possible. For example, the binding members 37 could have a plurality of studs spaced apart therealong, with cooperating engaging apertures provided on the body 40 of the tensioning unit 39.

The tensioning unit 39 further includes adjustment means 42 for displacing the body 40 and engaged binding members 37 away from the gate post P in order to tension the binding members 37. The adjustment means 42 includes an elongate adjustment bolt 43 screwthreadably supported in a threaded bore 44 in the body 40. The bolt 43 has a leading end 45 which is directed toward and engages the gateway post P in use of the gate fitting 1. As the bolt 43 is rotated, the body 40 is moved linearly toward or away from the gateway post P, depending on the direction of rotation. That in turn varies the tension applied to the binding members 37 thereby respectively releasing or securing the gate fitting 1 to the gateway post P.

To ensure more uniform distribution of the force applied to the gateway post P by the bolt 43, a radially extending pressure plate 46 may be provided at the leading end 45 of the bolt 43.

Penetration means 47 for penetrating into the gateway post P may also be provided at the leading end 45 to ensure that the tensioning unit 39 is positively located relative to the post P. The leading end 45 may be conically tapered to a point beyond the pressure plate 46, to provide the penetration means 47.

The bolt 43 (as shown) is provided with a handle 48 for manual rotation. The handle 48 may be in the form of radially extending lever arms. Alternatively (not shown), the bolt 43 may be provided with a standard hexagonal head or screwhead to allow rotation of the bolt 43 by a spanner, screwdriver, or the like.

To hang a gate G using the gate hinge fittings 1a, 1b as described above, appropriate fittings 1a, 1b are simply mounted on a selected gateway post P using the mounting means 36. During or after installation, if those fittings 1a, 1b are not correctly positioned, then they can be shifted through actuation of the tensioning unit 39 in order to loosen the binding members 37, relocation of the fitting 1a, 1b and then re-actuation of the tensioning unit 39 to tighten the binding members 37.

The gate closure fitting 1c is similarly mounted on a gateway post P, the restraining member 27 having a length selected to extend about an adjacent gate upright member $U_2$ when the gate G is closed. This allows the gate G to be held in a closed position by the restraining member 27 until such time as it is to be opened, whereupon the restraining member 27 is released by detaching the catch plate 31 from the catch bolt 33.

Finally, it is to be understood that various modifications and/or alterations may be made to the gate fittings without departing from the ambit of the present invention as defined in the claims appended hereto.

I claim:

1. A gate fitting for securing a gate to a gateway post, comprising: support means for connecting to a gate frame member; and, mounting means for mounting the support means on a gateway post, the mounting means including a pair of elongate binding members each connected to respective opposite sides of the support means for extending in opposite directions from the support means about the gateway post, and a tensioning unit including a tensioning body to which the binding members are connected, and adjustment means carried by the tensioning body and movable relative thereto, the adjustment means being engageable with the gateway post and movable relative to the tensioning body in order to move the tensioning body radially away from the gateway post in order to tension the binding members about the post and thereby secure the support means in position on the gateway post.

2. A gate fitting as claimed in claim 1, wherein the binding members are binding chains.

3. A gate fitting as claimed in claim 1, wherein each binding member has a plurality of connecting holes therein, and the tensioning unit has connecting hooks for loosely engaging through selected holes to connect the binding member thereto.

4. A gate fitting as claimed in claim 1, wherein the adjustment means includes an elongate adjustment bolt screw threaded into the tensioning body, and having a leading end for engaging the gateway post, and adjustment bolt being rotatable to linearly move the tensioning body away from the gateway post.

5. A gate fitting as claimed in claim 1, wherein the support means includes a gate hinge member for hinged mounting of an upright frame member of the gate.

6. A gate fitting as claimed in claim 1, wherein the support means includes a gate closure member for connecting to an upright frame member of the gate to securely retain the gate in a closed position in a gateway.

7. A gate fitting for securing a gate to a gateway post, comprising: support means for connecting to a gate frame member; and, mounting means for mounting the support means on a gateway post, the mounting means including a pair of elongate binding members each connected to respective opposite sides of the support means for extending in opposite directions from the support means about the gateway post, and a tensioning unit including a tensioning body to which the binding members are connected, and adjustment means carried by the tensioning body and movable relative thereto, the adjustment means including an elongate adjustment bolt screw threaded into the tensioning body, and having a leading end for engaging the gateway post and a pressure plate adjacent the leading end for abutting against the gateway post, the adjustment bolt being rotatable to linearly move the tensioning body radially away from the gateway post in order to tension the binding members about the post and thereby secure the support means in position on the gateway post.

8. A gate fitting for securing a gate to a gateway post, comprising: support means for connecting to a gate frame member; and, mounting means for mounting the support means on a gateway post, the mounting means including a pair of elongate binding members each connected to respective opposite sides of the support means for extending in opposite directions from the support means about the gateway post, and a tensioning unit including a tensioning body to which the binding members are connected, and adjustment means carried by the tensioning body and movable relative thereto, the adjustment means including an elongate adjustment bolt screw threaded into the tensioning body, and having a leading end tapered to a point for engaging and penetrating into the gateway post, the adjustment bolt being rotatable to linearly move the tensioning body radially away from the gateway post in order to tension the binding members about the post and thereby secure the support means in position on the gateway post.

* * * * *